United States Patent [19]

Tieke et al.

[11] Patent Number: 4,771,111
[45] Date of Patent: Sep. 13, 1988

[54] POLYPYRROLE/POLYIMIDE COMPOSITIONS

[75] Inventors: Bernd Tieke, Villars-sur-Glâne; Sheik A. Zahir, Oberwil, both of Switzerland

[73] Assignee: Ciba-Geigy Corporation, Ardsley, N.Y.

[21] Appl. No.: 71,585

[22] Filed: Jul. 9, 1987

Related U.S. Application Data

[63] Continuation of Ser. No. 817,215, Jan. 8, 1986, abandoned.

[30] Foreign Application Priority Data

Jan. 17, 1985 [CH] Switzerland ............................ 205/85

[51] Int. Cl.$^4$ .......................... C08L 77/06; H01B 1/12
[52] U.S. Cl. .................................. 525/182; 525/180; 525/417; 525/436; 252/500; 428/473.5
[58] Field of Search ............... 525/180, 182, 417, 436; 428/473.5; 252/500

[56] References Cited

U.S. PATENT DOCUMENTS

| | | |
|---|---|---|
| 3,666,709 | 5/1972 | Suzuki et al. |
| 3,708,458 | 1/1973 | Alberino et al. |
| 3,856,752 | 12/1974 | Bateman et al. |
| 4,401,545 | 8/1983 | Naarmann et al. |
| 4,532,188 | 7/1985 | Naarmann et al. |
| 4,559,112 | 12/1985 | Tamamuro et al. ............. 428/473.5 |
| 4,604,427 | 8/1986 | Roberts et al. ...................... 525/417 |
| 4,644,037 | 2/1987 | Druy et al. .......................... 525/417 |
| 4,665,129 | 5/1987 | Naarmann et al. ................. 252/500 |

FOREIGN PATENT DOCUMENTS

| | | |
|---|---|---|
| 3223544 | 12/1983 | Fed. Rep. of Germany. |
| 3227914 | 2/1984 | Fed. Rep. of Germany. |
| 3338905 | 5/1985 | Fed. Rep. of Germany ...... 429/213 |
| 3410494 | 10/1985 | Fed. Rep. of Germany ...... 525/417 |
| 2134125 | 8/1984 | United Kingdom. |

OTHER PUBLICATIONS

O. Niwa et al., J. Chem. Soc. Chem. Commun., 1984, 817.
M. A. DePaoli et al., J. Chem. Soc. Chem. Commun, 1984, 1015.
F. W. Harris et al., Academic Press, New York, 1977, pp. 183–188.
Encyclo. Chem. Tech., 3rd Edit., vol. 18, 709–719 (1982).
G. Ahlgren et al., J. Chem. Soc. Chem. Commun., 1984, 946.
H. Lindenberger et al., "Elect. Prop. Poly. & Rel Cmpds., Spr. Ver. Berlin", pp. 194–195.
O. Niwa et al., Appl. Phys. Lett. 46 (4), 444 (1985).
S. E. Lindsey et al., Synthetic Metals, 10, 67 (1984/1985).
M. Hikita et al., Jap. J. Appl. Phys. 24 (2), L79 (1985).
S. L. Rosen, "Fundamental Principles of Polymeric Materials", Wiley-Interscience, New York, pp. 7–8, 27–29 (1982).
K. J. Saunders, "Organic Polymer Chemistry", Chapman-Hall, London, pp. 41–43 (1973).
Kirk-Othmer, Encyclopedia Chem. Tech., vol. 18, 3rd Ed., Wiley-Interscience, New York, pp. 406–407 (1982).

Primary Examiner—Lewis T. Jacobs
Assistant Examiner—David W. Woodward
Attorney, Agent, or Firm—Luther A. R. Hall

[57] ABSTRACT

The invention relates to compositions of a soluble polyimide and polypyrrole. These compositions can preferably be prepared by anodic oxidation of pyrrole or a pyrrole derivative at electrodes coated with polyimide. They make it possible to prepare free standing electrically conductive films.

11 Claims, No Drawings

POLYPYRROLE/POLYIMIDE COMPOSITIONS

This application is a continuation of application Ser. No. 817,215, filed on Jan. 8, 1986, now abandoned.

The present invention relates to polypyrrole/polyimide compositions, preferably polyimide films, which are modified by a polymerised or copolymerised pyrrole derivative, to a process for the preparation of said films, and to the use thereof as electrically conductive films or as composites.

Polypyrrole films or films made from copolymers of pyrrole are known. These films have high electrical conductivity and are resistant to ambient conditions (air, moisture). However, the mechanical properties of these films are unsatisfactory. Polypyrrole films containing inorganic anions are brittle and tear easily under stress. This limits their usefulness for technical applications, as they can for example only be shaped with difficulty. There has therefore been no lack of attempts to improve polypyrrole films with respect to their technical application.

German Offenlegungsschrift No. 3 227 914 discloses a process for processing polypyrrole, wherein the polymer is shaped under specific elevated temperatures under pressure and optionally with further substances.

The preparation of electrically conductive films made from polypyrrole and other conventional insulating polymers, e.g. PVC, has already been reported on (q.v. Niwa and Tanamura, J. Chem. Soc. Chem. Comm., 1984, 817 and De Paoli, Waltmann, Diaz and Bargon, J. Chem. Soc. Chem. Comm., 1984, 1015).

To this end, platinum electrodes are coated on the surface with a 1 to 10 μm thick polymer film and a current is applied to these anodes in an electrolytic cell. The electrolyte solution contains pyrrole. Even after a brief application of current, polypyrrole deposits onto the insulating polymer film such that the good mechanical properties of the insulating polymer film are retained and the conductivity of the composition corresponds to that of pure polypyrrole films. Pyrrole polymers have a high temperature resistance, even at temperatures above 250° C. In contrast, the mechanical properties of the carrier material employed heretofore for electrolytically deposited polypyrroles undergo changes at such high temperatures: either the material becomes thermoplastic or it begins to decompose at these temperatures. So far polyimides have not been used. It has now been found that it is possible to prepare high temperature resistant polyimide/polypyrrole compositions with a high glass transition temperature.

Accordingly, the present invention relates to a composition which contains polypyrrole and a polyimide said polyimide being soluble in organic solvents.

The soluble polyimides which are suitable for the preparation of the compositions of this invention can be divided into the following compound classes:

(A) compounds which are soluble in organic solvents and contain the recurring structural unit of formula I

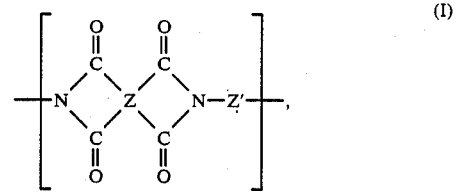

wherein the four carbonyl groups are attached direct to separate carbon atoms, which carbonyl groups are ortho or peri to one another so that 5- or 6-membered imide rings are formed, and Z is a tetravalent organic radical which contains at least one aromatic ring, and Z' is a divalent aliphatic, cycloaliphatic, aromatic, araliphatic or heterocyclic radical, or wherein Z and/or Z' denote combinations of said radicals within the given definition;

(B) compounds which are soluble in organic solvents and contain the recurring structural unit of formula II

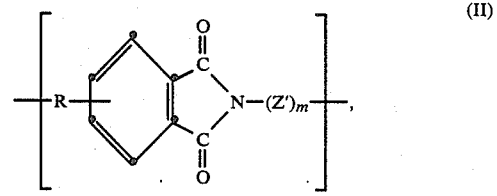

wherein Z' is as defined for formula I, R is a direct C—C bond or is a radical selected from:

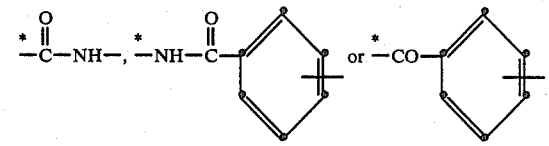

wherein m is 1 if R is —CO—NH— and is 0 where R is one of the other radicals, and * denotes the respective site of attachment to the aromatic radical;

(C) compounds which are soluble in organic solvents and contain the recurring structural unit of formula III

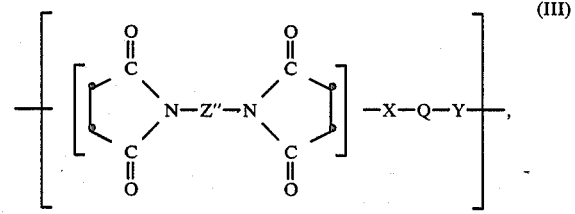

wherein each of Z" and Q independently of the other has one of the meanings given above for Z', and each of X and Y independently of the other is —O— or —NH—.

In particular, the polyimides of compound class (A) are normally insoluble in organic solvents. As generally valid connections between structure and solubility of a polyimide cannot at present be established, routine tests must be carried out in order to determine whether a specific compound is soluble or not and hence can be used as carrier film in this invention.

A polyimide is usually regarded as soluble if it has a solubility of at least 1 mg/l, preferably of at least 1 g/l, at 25° C. in the respective solvent.

Connections between molecular structure and solubility of polyimides are described by F. W. Harris and Lynn H. Lanier in "Structure-Solubility Relationships in Polyimides", Academic Press, New York, 1977, pp. 183–198. The soluble polyimides listed therein can also be employed as carrier films within the scope of this invention.

The tetravalent radical Z can be selected from the following general groups: aromatic, aliphatic, cycloaliphatic and heterocyclic groups, combinations of aromatic and aliphatic groups and the corresponding substituted groups thereof. The groups Z preferably comprise the following structures:

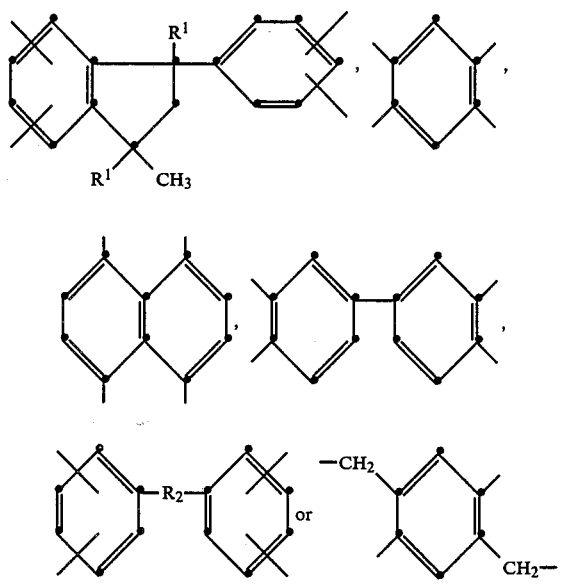

wherein $R^1$ is hydrogen or $C_1$-$C_5$alkyl, and $R^2$ is selected from the group consisting of alkylene of 1 to 3 carbon atoms,

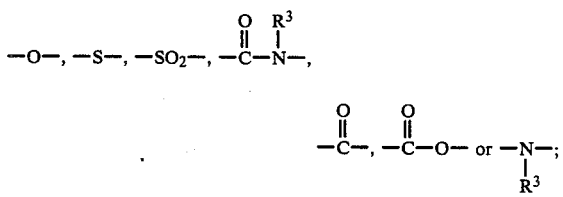

where $R^3$ is hydrogen, $C_1$-$C_5$alkyl or phenyl.

The above defined group $Z'$ may preferably be selected from alkylene groups of 2 to 12 carbon atoms, cycloalkylene groups of 4 to 6 carbon atoms; a xylylene group, arylene groups selected from o-, m- or p-phenylene which may carry 1 to 4 $C_1$-$C_5$alkyl radicals, biphenylene, naphthylene or anthrylene; a substituted arylene group of the formula

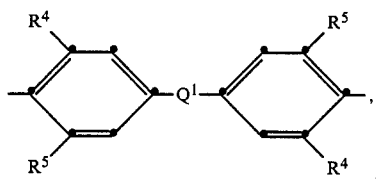

wherein $Q^1$ is a covalent bond, —CO—, —O—, —S—, —SO—, —SO$_2$—, —N=N— or —NR$^1$—, or is a linear or branched alkylene group of 1 to 3 carbon atoms, arylene, preferably the phenylene group, or is a dialkyl- or diarylsilyl group, and each of $R^4$ and $R^5$ independently of the other is hydrogen, halogen, preferably chlorine or bromine, or alkyl of 1 to 5 carbon atoms, preferably methyl, alkoxy of 1 to 5 carbon atoms, preferably methoxy, or is aryl, preferably phenyl; or $Z'$ is a radical of the formula IX

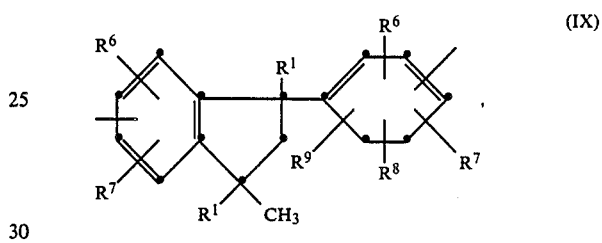

wherein $R^1$ has the given meaning and each of $R^6$, $R^7$, $R^8$ and $R^9$ independently is hydrogen, halogen or $C_1$-$C_5$alkyl, preferably hydrogen or $C_1$-$C_5$alkyl.

$R^1$, $R^2$, $R^3$, $R^4$, $R^5$, $R^6$, $R^7$, $R^8$ and $R^9$ as $C_1$-$C_5$alkyl radicals may be methyl, ethyl, n-propyl, isopropyl, n-butyl, sec-butyl, tert-butyl, n-pentyl or neopentyl, with methyl being preferred.

$R^4$ and $R^5$ as $C_1$-$C_5$alkoxy may be methoxy, ethoxy, n-propoxy, isopropoxy, n-butoxy, sec-butoxy, tert-butoxy, n-pentoxy or neopentoxy, with methoxy being preferred.

$R^4$, $R^5$, $R^6$, $R^7$, $R^8$ or $R^9$ as halogen are fluorine, chlorine, bromine or iodine. Bromine and chlorine are preferred, with chlorine being most preferred.

$R^4$ and $R^5$ as aryl may be phenyl, or naphthyl which naphthyl can be attached in position 1 or 2 to the rest of the system. The preferred meaning is phenyl.

$Z'$ as $C_2$-$C_{12}$alkylene is straight chain or branched alkylene, e.g. ethylene, trimethylene, tetramethylene, pentamethylene, hexamethylene, heptamethylene, octamethylene, nonamethylene, decamethylene, undecamethylene, dodecamethylene, as well as —C(CH$_3$)$_2$—, —(CH$_2$)$_3$—C(CH$_3$)$_2$—(CH$_2$)$_3$— or —(CH$_2$)$_3$—CH(CH$_3$)—(CH$_2$)$_4$—. The three last mentioned branched alkylene radicals, as well as hexamethylene, are preferred.

$Q^1$ as a linear or branched $C_1$-$C_3$alkylene group may be methylene, ethylene, trimethylene, ethylidene or 2-propylidene. Ethylidene and 2-propylidene are preferred.

$Z'$ as a $C_4$-$C_6$cycloalkylene group may be cyclobutylene, cyclopentylene or cyclohexylene. These radicals may be attached in the 1,2-, 1,3- or 1,4-position to the rest of the molecule. The 1,4-position is the preferred position of attachment. 1,4-Cyclohexylene is most preferred.

Z' as xylylene is o-, m- or p-xylylene, but may also be a mixture of these radicals. Mixtures of xylylenes or p-xylylene are preferred.

Where Z' is tolylene, the attachment to the rest of the molecule may be in the 2,3-, 2,4-, 2,5-, 2,6-, 3,5-, 3,6-, 4,5- or 4,6-position, with respect to the methyl group.

Where Z' is biphenylene, the attachment to the rest of the molecule may be at any position of the biphenylene. Preferred radicals are those in which each phenyl nucleus of the biphenylene forms a valence to the rest of the molecule. Most preferably, such radicals are the 4,4'-, 3,3'- or 2,2'-derivatives, first and foremost the 4,4'-derivative.

$Q^1$ as arylene may be phenylene or naphthylene, with phenylene being preferred. Phenylene shall be understood as meaning here o-, m- or p-phenylene, with p-phenylene being preferred.

$Q^1$ as dialkylsilyl may be dimethylsilyl, diethylsilyl, di-(n-propyl)silyl, di-(isopropyl)silyl or di-(n-butyl)silyl, with dimethylsilyl being preferred.

$Q^1$ as diarylsilyl is preferably diphenylsilyl.

The polyimides of the above compound types A, B or C are preferably compounds that contain the structural units of formula I, II or III in the same sequence. The most preferred polyimides are those consisting exclusively of structural units of formula I, II or III, as well as of combinations of the different possible structural units of formula I, II or III as defined herein.

The chain length of the polyimides can vary within wide limits. It is preferred to use polyimides containing from 5 to 1000 of the recurring structural units of formula I, II or III. However, it is most preferred to use polyimides containing more than 10, in particular from 10 to 500, of the recurring structural units of formula I, II or III.

It is most preferred to use those polyimides which consist of recurring structural units of formula I and are soluble in organic solvents.

Particularly preferred soluble compounds containing the structural units of formula I are those wherein Z is a radical selected from those radicals defined hereinbefore as preferred, or is a combination of said radicals, wherein $R^1$ is as defined above, preferably hydrogen or methyl, $R^2$ is —CH$_2$—, —CO— or —C(CH$_3$)$_2$, and Z' is a radical selected from

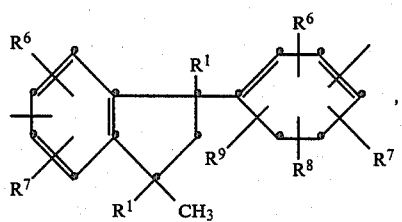

,

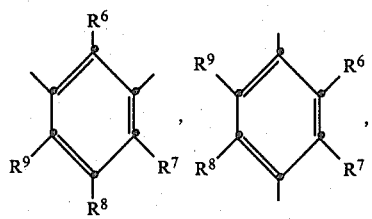

,

-continued

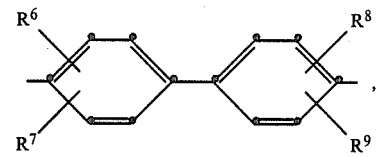

,

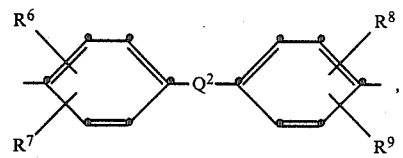

,

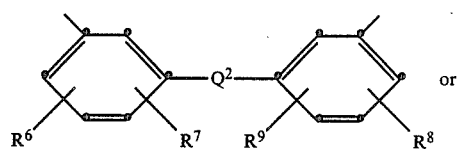

or

or a combination of said radicals, wherein $R^1$ and $R^6$ to $R^9$ are as defined above, and $Q^2$ is —CH$_2$—, —CO—, —O—, —S—, —SO—, —SO$_2$— or —C(CH$_3$)$_2$—.

Also particularly preferred are polyamides of formula I, wherein Z is a radical selected from

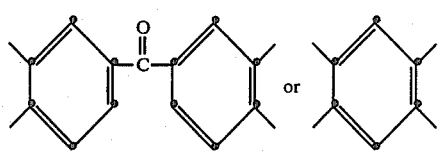

or is a combination of said radicals, and wherein Z' is a radical selected from

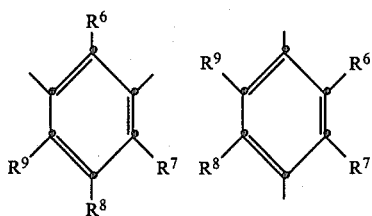

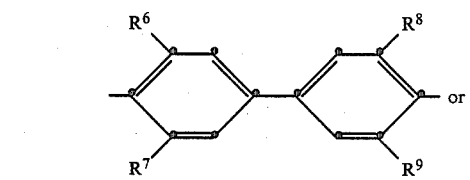 or

-continued

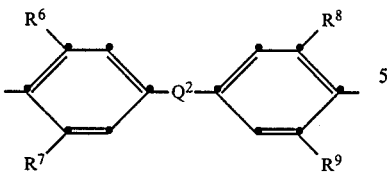

or is a combination of said radicals, and wherein at least one of $R^6$ to $R^9$ is $C_1$–$C_5$alkyl, and $R^6$ to $R^9$ and $Q^2$ have the further meanings as given above.

A particularly preferred embodiment of this invention comprises the use of soluble polyimides containing essentially the recurring structural unit of formula I, wherein (1) out of the total number of recurring polyimide units
 (A) 0 to 100% of such units have Z equal to a phenylindane radical of the structural formula

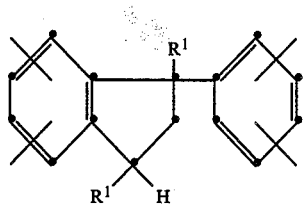

and (B) 0 to 100% of such units have Z' equal to a phenylidane radical of the structural formula

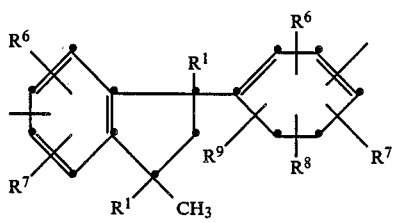

wherein $R^1$ and $R^6$ to $R^9$ are as defined above, with the proviso that (2) out of the total number of radicals Z and Z', at least 10% are phenylindane radicals.

Phenylindane polyimides of this type are described in U.S. Pat. No. 3,856,752. For particulars concerning the preparation and the preferred range of these compounds, attention is drawn to the description of that patent specification.

Another preferred polyimide of type (A) contains, as tetravalent radical Z, groups of the formula

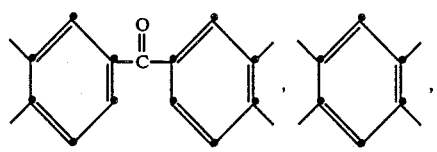

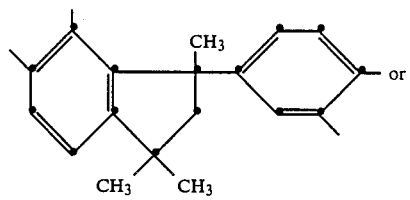

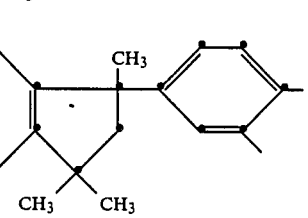

or mixtures of said groups, and, as divalent radical Z', groups of the formulae

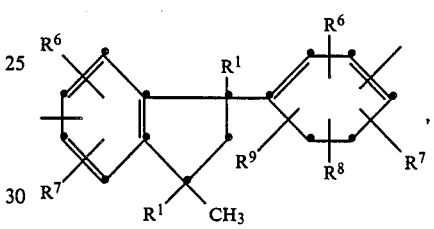

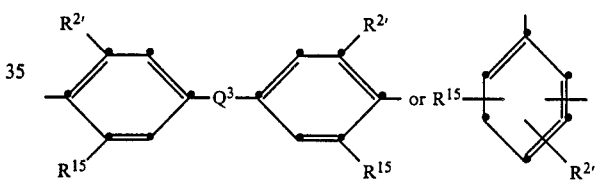

or mixtures of said groups. Out of the total number of radicals Z and Z', at least 10% are phenylindane radicals as defined above, $R^1$ and $R^6$ to $R^9$ are each independently hydrogen or methyl, $R^{2'}$ is hydrogen, halogen or $C_1$–$C_5$alkyl, preferably hydrogen or methyl, and $Q^3$ is a C—C bond, —$CH_2$—, —$C(CH_3)_2$—, —CO—, —O—, —S— or —$SO_2$—. $R^{15}$ has the same meaning as $R^{2'}$.

Further preferred polyimides are compounds of formula I containing, as structural unit Z', only phenylindane radicals as defined above.

Polyimides of formula I also meriting attention are those which contain, as Z', 10 to 100% phenylindane radicals as defined above, and which contain 0 to 90% of radicals of the formulae

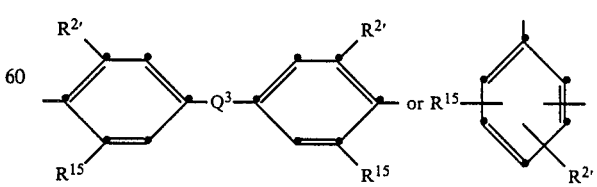

or mixtures thereof, wherein $R^2$ and $R^{15}$ are independently hydrogen or $C_1$–$C_5$alkyl, preferably hydrogen or methyl, but most preferably hydrogen.

Particularly interesting polyimides of formula I are those containing, as groups Z, 0 to 100% of the radicals

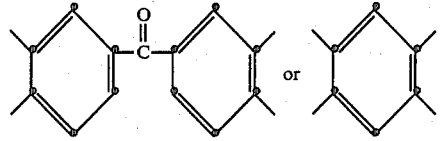

or mixtures of said radicals, and 100 to 0% of the radicals

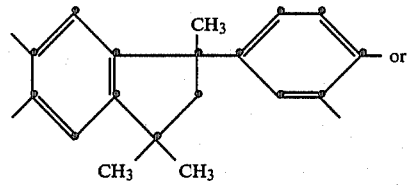

or mixtures thereof, but containing at least 10% of phenylindane radicals, based on Z and Z'.

Further interesting polyimides of formula I are those containing, as Z, 100% of the radicals

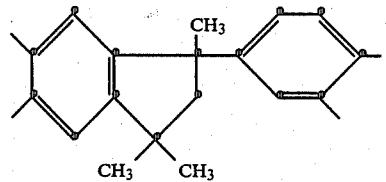

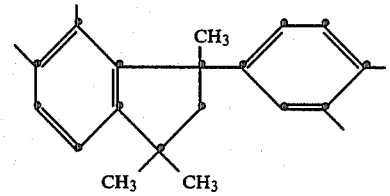

or mixture thereof.

Especially preferred polyimides of formula I in the compositions of this invention are those containing, as Z, 100% of groups of the formula

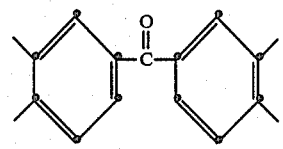

or of the formula

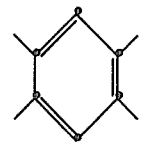

and containing, as Z', exclusively radicals of the formula

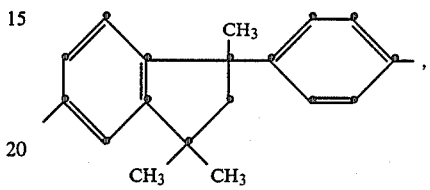

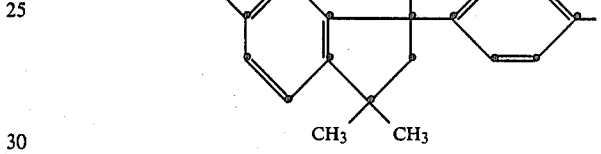

or mixture thereof.

Finally, polyimides of formula I containing, as groups Z, radicals of the formulae

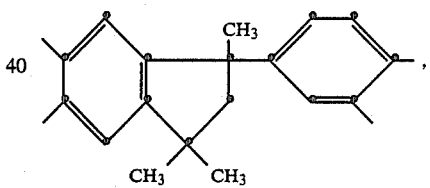

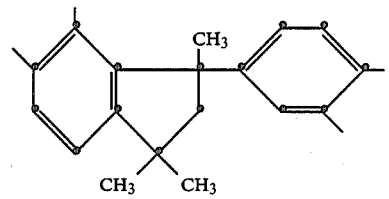

or mixture thereof.

and, as groups Z', radicals of the formulae

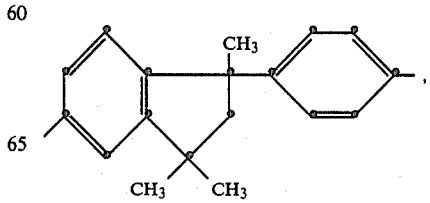

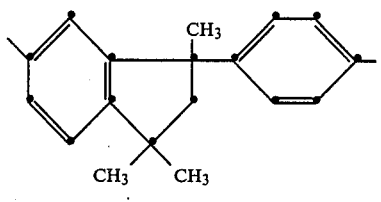

or mixture thereof.
are also of interest.

Particularly preferred polyimides of formula I in the compositions of this invention are also those wherein Z is

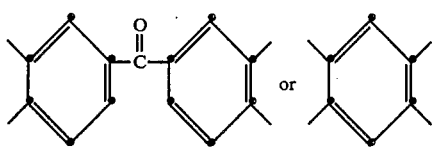

and Z' is exclusively

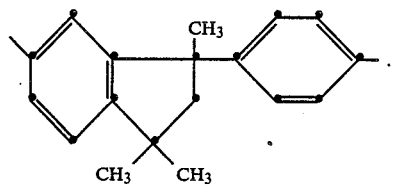

Mention is also to be made of polyimides of formula I, wherein Z is

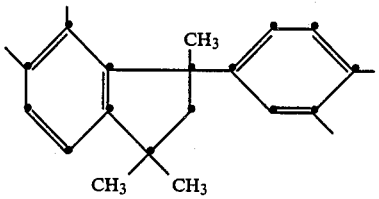

or mixture thereof.
and Z' is

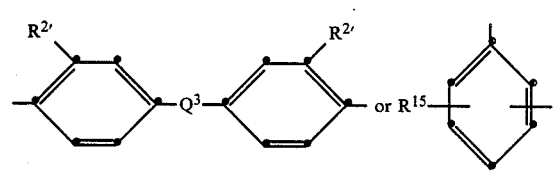

wherein $R^{2'}$, $R^{15}$ and $Q^3$ are as defined above.

Further polyimides of formula I meriting interest are those wherein Z is selected from

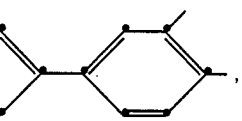

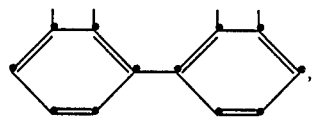

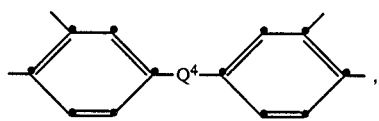

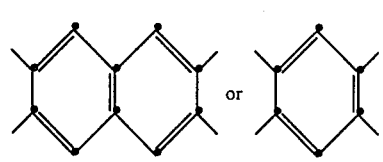

and Z' is selected from

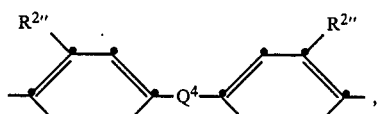

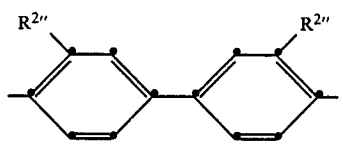

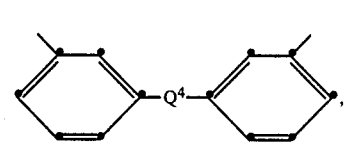

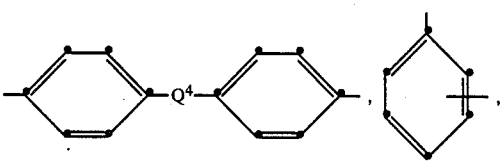

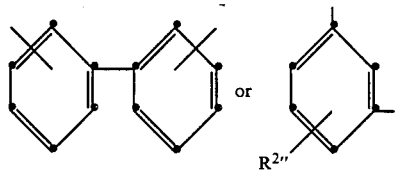

wherein $Q^4$ is —O—, —S—, —SO$_2$—, —CH$_2$—, —CO— or —C(CH$_3$)$_2$— and $R^{2''}$ is C$_1$-C$_5$alkoxy, halogen, —COOH, —OH or —SO$_3$H; and at least 30% of the groups Z are a radical of the formula

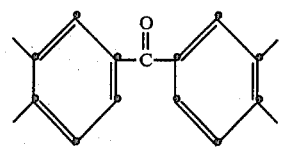

and at least 30% of the groups Z' are radicals of the formulae

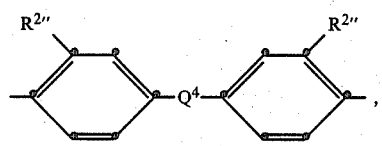

or mixture thereof;
said polyimides having a solubility in phenol of more than 10% by weight and 0.5 g/100 ml of said polyimides having an inherent viscosity of more than 0.05 in m-cresol (at 30° C.). Polyimides of this type are disclosed in U.S. Pat. No. 3,666,709.

Further interesting polyimides of formula I are those wherein Z is

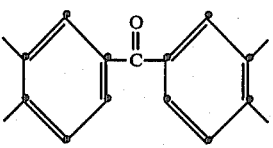

and wherein 10 to 90% of the radicals Z' are 4,4'-diphenylmethane and the remaining radicals Z' are

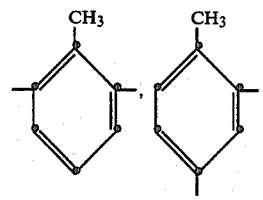

or mixture thereof.
Compounds of this type, and the preparation and use thereof, are disclosed in U.S. Pat. No. 3,708,458.

Particularly preferred soluble polyimides of formula II (type B) are those in which the radical R is in the meta-position to one of the carbonyl groups of the imide system.

Of primary interest are soluble polymers of formula II, wherein R is selected from

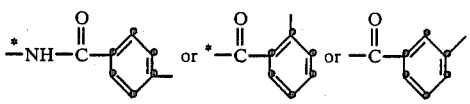

It is also preferred to use compounds of formula II, wherein m is 0.

If the compounds of formula II contain radicals Z', said radicals are preferably the groups specified above, most preferably 4,4'-diphenylmethane, 4,4'-diphenyl ether or 4,4'-diphenyl sulfone.

If soluble polyimides of formula III (type C) are used, these are preferably compounds wherein Z" is an aromatic radical and Q is an alkylene group of 2 to 12 carbon atoms or an arylene group selected from o-, m- or p-phenylene or o-, m- or p-tolylene, or an aryl group of the formula

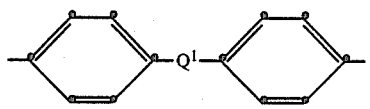

wherein $Q^1$ has one of the meanings given above but is preferably —O—, —S—, —SO$_2$—, —CO—, —CH$_2$— or —C(CH$_3$)$_2$—.

The radicals Z" and Q may have the same meanings but they can also be different.

X and Y preferably have the same meaning. It is particularly preferred to use compounds of formula III, wherein X and Y are —NH—.

Among the aromatic radicals Z" of compound III, special mention is to be made of o-, m- or p-phenylene, as well as tolylene or xylylene and 4,4'-biphenylene, 2,2'-biphenylene, or radicals of the formula

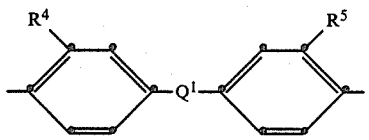

wherein $R^4$, $R^5$ and $Q^1$ have the general and preferred meanings as indicated above.

The polyimides can be prepared by different methods. One method starts from the reaction of aromatic tetracarboxylic acids, the carboxyl groups of which are always in pairs ortho to each other. These tetracarboxylic acids or their dianhydrides are reacted with bifunctional primary amines to polyamic acids. These intermediates are normally soluble and may be processed to moulded articles. In a second step, the polyamic acid is cyclised to form the polyimide.

Instead of the tetracarboxylic acid, it is also possible to use their functional derivatives, for example their chlorides or esters.

The formation of the amic acid can be carried out in the melt, but preferably in a polar solvent such as dimethylformamide, dimethylacetamide, dimethylsulfoxide, N-methylpyrrolidone or m-cresol. The reaction temperature is preferably not allowed to rise above 50° C. so as to prevent a premature cyclisation to the polyimide.

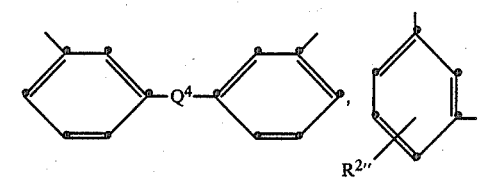

The cyclisation step is preferably carried out in the temperature range above 150° C. and, if desired, a dehydrating agent, for example acetic anhydride, is added.

A further method of synthesising polyimides comprises the use of tetracarboxylic anhydrides which are reacted with diisocyanates instead of diamines. This reaction usually leads direct to the polyimides, with elimination of $CO_2$. However, it is also possible to obtain polyamic acids by using tetracarboxylic acids as starting materials. Polyimides of type C can be obtained by reacting bismaleimides with primary diamines or with diols. Such bismaleimides can also be reacted as bifunctional dienophiles, in a Diels-Alder reaction with bisdienes, to give polyimides.

An outline of the individual methods of preparing polyimides or different types of polyimides will be found in Encycl. Chem. Tech., 18, 709–719 (1982).

Pyrrole monomers which can be polymerised are pyrrole or substituted pyroles which may be C-substituted, N-substituted or both C- and N-substituted. These pyrroles must have at least two hydrogen atoms in the nucleus (C-bonded) so that the polymerisation can run.

In particular, the term "pyrrole" shall be understood as meaning homo- or copolymers of pyrrole, substituted pyrrole or mixture thereof, or copolymers of pyrrole, substituted pyrrole or mixture thereof with 5- or 6-membered heteroaromatic compounds.

The pyrrole monomers preferably have the structure of formula X

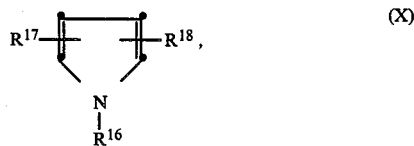

wherein $R^{16}$ is hydrogen, alkyl, cycloalkyl, aryl, aralkyl or alkaryl, which organic radicals may be substituted by —$COR^{20}$, —$COOR^{20}$, —$SO_2R^{20}$, —$SO_3R^{20}$, —$PO_3R^{20}R^{21}$, —$PO_2R^{20}$, —$NR^{20}R^{21}$, —$OR^{20}$, —$SR^{20}$, —CN oder —$SiR^{22}R^{23}R^{24}$, or wherein $R^{16}$ is also —CN, —$SO_2R^{20}$, —$SO_3R^{20}$, —$COR^{20}$, —$PO_2R^{20}$ or —$SiR_3^{22}$, each of $R^{20}$ and $R^{21}$ independently of the other is hydrogen, alkyl, aryl or aralkyl, each of $R^{22}$, $R^{23}$ and $R^{24}$ independently is alkyl or phenyl, each of $R^{17}$ and $R^{18}$ independently of the other is hydrogen, alkyl, cycloalkyl, aryl, aralkyl, alkaryl, —$COR^{19}$, —CN or halogen, and $R^{19}$ is hydrogen, alkyl or aryl.

$R^{16}$, $R^{17}$, $R^{18}$, $R^{19}$, $R^{20}$, $R^{21}$, $R^{22}$, $R^{23}$ and $R^{24}$ as alkyl are preferably $C_1$-$C_{20}$alkyl, e.g. methyl, ethyl, propyl, butyl, cetyl, lauryl or stearyl, with methyl being particularly preferred.

$R^{16}$, $R^{17}$ and $R^{18}$ as cycloalkyl are preferably $C_5$-$C_7$-cycloalkyl, e.g. cyclopentyl, cyclohexyl or cycloheptyl, with cyclohexyl being most preferred.

$R^{17}$ and $R^{18}$ as halogen are fluorine, chlorine, bromine or iodine, with bromine or chlorine being preferred.

Aryl radicals are preferably phenyl or naphthyl, but are most preferably phenyl.

Aralkyl radicals are preferably $C_7$-$C_{14}$aralkyl, in particular benzyl.

Alkaryl will preferably be understood as meaning $C_7$-$C_{14}$alkaryl and is most preferably tolyl or xylyl.

Substituted radicals are preferably mono- or disubstituted groups, most preferably monosubstituted groups.

Preferred pyrroles are unsubstituted pyrrole, the N-alkylpyrroles, preferably N-methylpyrrole, or the N-arylpyrroles, preferably N-phenylpyrrole, as well as the pyrroles which are substituted at the carbon atoms by one or two alkyl groups or the pyrroles which are substituted at the carbon atoms by one or two halogen atoms.

Among these two last mentioned compound classes, the mono- or dimethyl compound or the monobromo or dibromo compound as well as the monochloro or dichloro compound is particularly preferred.

Carbon-substituted pyrroles are preferably substituted in the 3-position, 4-position or both 3- and 4-positions.

Within the scope of this invention, pyrrole polymers will be understood as meaning quite generally homopolymers as well as copolymers of pyrroles.

In particular, the homopolymers of unsubstituted pyrrole itself come into this category. However, it is also possible to prepare copolymers of the above mentioned pyrroles, preferably of unsubstituted pyrrole, with other comonomers, preferably with other 5- or 6-membered heteroaromatic compounds. Among these heteroaromatic compounds, particularly preferred compounds are: furan, thiophene, thiazole, oxazole, thiadiazole, imidazole, pyridine, 3,5-dimethylpyridine, pyrazine, pyridazine, 3,5-dimethylpyrazine, carbazole or phenothiazine.

Copolymers of this type and the preparation thereof are described e.g. in German Offenlegungsschrift No. 3 223 544.

Particularly preferred copolymers are those of unsubstituted pyrrole and unsubstituted or substituted N-methylpyrrole, as well as copolymers of unsubstituted pyrrole or N-methylpyrrole and thiophene or furan.

The preparation of the polypyrrole containing polyimide compositions is effected by polymerisation of the pyrrole monomer in the presence of a polyimide film. This polymerisation can be carried out by electrolysis, but any other polymerisation process can be employed, for example a polymerisation using redox pairs.

Polypyrrole is electrically (electronically) conductive in the charged or oxidised state. It is produced in this state by electrochemical polymerisation. During the electrochemical polymerisation, a counterion is inserted into the material to compensate for the positive charge at the polymer backbone.

However, polypyrrole can also be discharged and converted into a reduced (yellow) form, in which state it is an electrical insulating material.

Within the scope of this invention, the term "polypyrrole" will be understood as meaning the oxidised and also the reduced form, but preferably the oxidised form.

The compositions of the present invention are preferably prepared by anodic oxidation of a solution of a pyrrole monomer in a polar solvent at an electrode which is in contact with the appropriate polyimide film. It is most preferred to use electrodes coated with polyimide. The solvent contains a conducting salt, the anions of which, as stated above, are inserted into the polypyrrole film and result in an increase of conductivity. The conducting salt is added in the form of the respective protic acid or of a salt thereof, preferably the tetraalkylammonium or alkali metal salt, to the electrolyte.

Accordingly, the invention relates preferably to conductive polyimide/polypyrrole compositions containing polypyrrole in the oxidised form and, as counterion, an anion selected from the group consisting of $BF_4^-$, $PF_6^-$, $AsF_6^-$, $SbF_6^-$, $SbCl_6^-$, $ClO_4^-$, $IO_4^-$, $HSO_4^-$, $SO_4^{2-}$, $CF_3SO_3^-$, $CH_3C_6H_4SO_3^-$, $CF_3COO^-$, $HC_2O_4^-$ or $[Fe(CN)_6]^{3-}$, as well as from alkyl sulfate, alkyl sulfonate, alkyl phosphate or alkylphosphonate, as well as a combination of said anions.

The insertion of counterions and the resultant increase in conductivity is known and described e.g. in J. Electrochem. Soc. 128, 2596 (1981).

Hence the invention also relates to a proces for the preparation of polyimide/polypyrrole films by anodic oxidation of a dissolved pyrrole and an optional suitable comonomer, at an electrode which is in contact with a polymer film, wherein the material employed for the polymer film is a polyimide which is soluble in organic solvents.

The electrolysis is preferably carried out in a polar organic solvent which dissolves pyrrole and conducting salt, but not the polyimide film on the electrode. Examples of suitable polar organic solvents are alcohols, polyols, organic carbonates such as propylene carbonate, ethers such as 1,2-dimethoxyethane, dioxane, tetrahydrofuran and methyl tetrahydrofuran, nitriles such as acetonitrile and benzonitrile, N-methylpyrrolidone, methylene chloride, dimethylsulfoxide, dimethylformamide, or acetone. The preferred solvent is acetonitrile.

If water-miscible solvents are employed, small amounts of water to increase the electrical conductivity are added, usually in amounts up to 3%, based on the organic solvent. Preferred water-miscible solvents are lower ($C_1$-$C_4$) alcohols, ethers such as dioxan, tetrahydrofuran or 1,2-dimethoxyethane, glacial acetic acid, dimethylformide, N-methylpyrrolidone, acetonitrile or propylene carbonate.

It is, however, also possible to use two-phase electrolytic baths, by which are meant mixtures of water containing the dissolved pyrrole and the optional copolymerisable component, and an organic diluent which is not miscible with water.

Examples of such diluents are organic hydrocarbons such as aliphatic or aromatic hydrocarbons as well as halogenated aliphatic or aromatic hydrocarbons. Specific examples are hexane, toluene, 1,2-dichloroethane, dichloromethane, tetrachloromethane or chlorobenzene.

The electrolytic cell may contain further auxiliaries which impart the desired properties to the compositions of the invention. Examples of such substances comprise plasticisers, redox pairs, wetting agents or emulsifiers. Regarding such auxiliaries, reference is made to German Offenlegungsschrift 3 402 133, in which such electrolytic systems and their effect on the properties of the finished polypyrrole films are described in detail. The electrolyte contains a solution of the pyrrole monomer and the optional comonomer component.

The amount of this monomer, or of these monomers, in the electrolytic cell may vary within a wide range. However, the total amount of dissolved monomer must be greater than the concentration required to form the total amount of polymer.

The amount of pyrrole and of the optional comonomer component present in the electrolytic solution must be sufficient to ensure a reasonable rate of reaction. As a rule, concentrations of more than $10^{-3}$ mole per liter are necessary. The saturation concentration of the pyrrole or comonomer in the respective electrolyte shall be ragarded as the upper limit of the monomer concentration. It is preferred to use 0.01 mole per liter to 0.1 mole per liter of dissolved pyrrole.

The concentration of conducting salt is preferably 0.001 to 1 mole per liter. But here too it is possible to employ a concentration up to saturation point of the electrolyte.

In carrying out the process of this invention, particular regard is to be had to the electrodes. Electrodes which are coated with the respective polyimide are employed. Useful electrode materials are conventional conductive materials, for example metals such as nickel or steel, which can be used for the polypyrrole synthesis. It is preferred to use graphite, steel or noble metals, especially platinum. However, it is also possible to use electrodes which are made from electrically conductive polymers, for example from polypyrrole or polythiophene formed by anodic oxidation, or from doped p-conductive polyphenylene.

The electrolytes may have any shape. Plate-shaped electrodes arranged in parallel may be used, or else cylindrical electrodes which can be rotated about their longitudinal axis.

The coating of the electrodes can be effected in a variety of different ways, for example by spin or curtain coating. Depending on the shape and material of the electrode, different requirements must be made of the coating procedure and of the electrode material as substrate.

A generally applicable, and therefore preferred, process comprises using a polyimide solution, applying said solution to the surface of the electrode and allowing the solvent to evaporate or removing the solvent by applying a vacuum, to leave a polyimide film. The thickness of this film can be controlled via the concentration or the amount of the solution employed.

It is preferred to use solutions of polyimides with a viscosity that is greater than 1%, most preferably greater than 5%, than that of the pure solvent.

Typical examples of organic solvents for soluble polyimides are: N,N-dimethylformamide, N,N-diemthylacetamide, N-methyl-2-pyrrolidone, N,N-diethylformamide, N,N-diethylacetamide, N-methylcaprolactam, dioxane, dimethylsulfoxide, tetramethylurea, pyridine, dimethylsulfone, hexamethylphosphoramide, tetramethylenesulfone, formamide, N-methylformamide, γ-butyrolactone, tetrahydrofuran, m-cresol, phenol, 2-methoxyethyl acetate, 1,2-dimethoxyethane, bis(2-methoxyethyl) ether, chloroform, and nitrobenzene.

The solvent may be used alone or in combination with diluents such as benzene, benzonitrile, xylene, toluene and cyclohexane.

However, there are also polyimides which are even soluble in solvents of low dissolving power. Examples of such solvents are aliphatic ketones such as cyclopentanone, cyclohexanone, cycloheptanone, cyclooctanone, 4-methylcyclohexanone, 3-methylcyclohexanone or 2-methylcyclohexanone; aromatic-aliphatic ketones such as acetophenone, propiophenone or butyrophenone; chlorinated hydrocarbons such as methylene chloride, chloroform, tetrachloroethylene, chlorobenzene or o-dichlorobenzene; ethers such as ethylene glycol dimethyl ether, diethylene glycol dimethyl ether, tetrahydrofuran or dioxan; ether acetals such as methyl glycol acetate or ethyl glycol acetate; as well as other polar aprotic solvents such as propylene carbonate or isophorone, which have a somewhat weaker dissolving power than the strongly dissolving polar aprotic solvents such as N-methypyrrolidone, γ-butyrolactone or N,N-dimethylacetamide.

The thickness of the polyimide films to be applied to the electrode is preferably not more than 50 μm, but most preferably less than 10 μm.

The electrolysis is preferably carried out with a simple electrolytic device comprising a cell without diaphragms and two electrodes, preferably steel or platinum electrodes. At least the anode onto which the pyrrole later deposits must be flat and coated with a polyimide film.

Other electrolytic devices, for example cells with diaphragms or those with reference electrodes for exact determination of the potential, may also be used. It is expedient to measure the charge (ampère* sec) to determine the amount of deposited polypyrrole.

The electrolytic solution can be agitated during the electrochemical polymerisation of monomers. Agitation can be effected by any of the customary means, for example by vigorous stirring with paddle stirrers, magnetic stirrers, ultrasonics, vibration or by passing gases through the electrolytes (including the gases produced at the cathodes). Stirring can also be effected by agitating the electrodes. The electrochemical polymerisation can be carried out by applying a voltage to the electrodes. This voltage is chosen such that it suffices to carry out the reaction and it may be a direct current voltage or an alternating current voltage on which a direct current component is superimposed. Alternating current voltages may have widely different time gradients: for example, sinusoidal or rectangular gradients. It is preferred to use direct current voltages.

The voltage between the electrodes should be sufficient to oxidise the monomers without producing appreciable changes in the cell, for example by degradation of components in the cell.

In general, current densities of up to 2 A/cm$^2$ are applied, preferably however current densities of less than 500 mA/cm$^2$.

The electrolysis can also be carried out under an inert gas, as well as in air.

In the electrolysis, the pyrrole monomer is oxidised at the anode. It is expedient to keep the temperature of the electrolyte in the range from $-20°$ to $+30°$ C. during the electrolysis. However, the temperatures may deviate from the indicated range. The temperature limits depend primarily on the electrolytic solution (solidification or evaporation point). The electrolysis is preferably carried out at room temperature.

The amount of pyrrole deposited onto the polyimide film will depend entirely on the intended end use of the films and can be rapidly determined by the skilled person by means of routine tests.

The pyrrole films deposited anodically during the electrolysis in the presence of conducting salts are conveniently washed with solvent to remove conducting salt adhering thereto, and dried at $\geq 50°$ C. After it has been dried, the polyimide/polypyrrole film can be easily peeled from the electrode.

The compositions of the invention can be used for making free-standing electrically conductive films with a high glass transition temperature and excellent tear strength. Such films can be used in the field of electronics and micro-electronics, for example as conductive composites in the fabrication of electric conductors, electrodes, batteries, switches or semi-conductors, as well as in antistatic finishing or in the electromagnetic screening of electronic components.

The films of the present invention thus combine high electrical conductivity, high mechanical stability, high thermal resistance ($T_g > 250°$ C.) and chemical resistance.

EXAMPLES

General working directions:

A glass vessel is charged with 250 ml of electrolytic solution (0.1 mole/l of conducting salt, 0.05 mole/l of pyrrole (derivative) and optional comonomer, and acetonitrile as solvent, with 1% water content). Two electrodes (50×20×1 mm), the anode of which is coated on the surface with a polyimide film[1], are put into the solution and spaced 4 cm apart. With stirring and while blanketing with argon, electrolysis is carried out for 5, 10 or 30 minutes. The formation of a polymer composite of the polyimide and polypyrrole rapidly causes the anode to turn dark green to black. After rinsing the anode with acetonitrile and drying it at 60° C., the polyimide/polypyrrole film can be removed from the substrate. The glass transition temperature ($T_g$) of the composite film corresponds to that of the pure polyimide film.

[1]Coating is effected by spin coating.

Examples 1–6

Polyimide/polypyrrole films are prepared in accordance with the general directions above. The polyimide employed is in each case DAPI polyimide[2]. The pyrrole monomers, the conducting salt and some properties of the composite film will be found in Table Ia. Parameters which are varied during the film formation are listed in Table Ib. All composite films can be folded and creased without tearing, whereas the corresponding pure polypyrrole films tear.

[2]DAPI polyimide contains the following structural unit:

TABLE 1a

[Polyimide polymer structure shown]

| Example | Monomer (mixture) for making the polypyrrole film | Conducting salt | Electrical conductivity of the composite film (S/cm) | $T_g$ of the composite film (°C.) |
|---|---|---|---|---|
| 1 | pyrrole | $(C_4H_9)_4N^{\oplus}$ $BF_4^{\ominus}$ | 0.5–10 | 320 |
| 2 | pyrrole | $(C_4H_9)_4N^{\oplus}$ $PF_6^{\ominus}$ | 15–18 | 320 |
| 3 | pyrrole | $(C_4H_9)_4N^{\oplus}$ $ClO_4^{\ominus}$ | 3–4 | 320 |
| 4 | pyrrole + N-(methoxycarbonylmethyl)pyrrole 1:3 | $(C_4H_9)_4N^{\oplus}$ $BF_4^{\ominus}$ | $1 \times 10^{-4}$ | 320 |
| 5 | pyrrole + thiophene 1:1 | $(C_4H_9)_4N^{\oplus}$ $BF_4^{\ominus}$ | $1 \times 10^{-5}$ | 320 |
| 6 | pyrrole | $(C_4H_9)_4N^{\oplus}$ $CH_3-C_6H_4-SO_3^{\ominus}$ | $2 \times 10^{-4}$ | 320 |

TABLE 1b

| Example | Electrode material | Current density (mA/cm²) | Thickness of the PI film (μm) | Duration of the electrolysis (min) |
|---|---|---|---|---|
| 1 | Pt | 1,7 | 5 | 5 |
| 2 | Pt | 1,2–1,4 | 2.5 | 10 |
| 3 | Pt | 1,2–2,2 | 2.5 | 10 |
| 4 | Inox[1] | 0,9 | 5 | 10 |
| 5 | Pt | 1,4–1,8 | 5 | 10 |
| 6 | Inox[1] | 0,3–0,7 | 5 | 30 |

[1] stainless steel

Examples 7–9

The procedure of of Example 1 is repeated, only other polyimide films are used for coating the electrode. The components of the film, as well as some of their properties, are indicated in Table IIa, and the conditions for the preparation of the films are set forth in Table IIb. All composite films can be folded and creased without tearing, whereas corresponding polypyrrole films tear.

TABLE IIa

| Ex. | Polyimide component | Pyrrole monomer | Conducting salt | Electrical conductivity of the composite film (S/cm) | $T_g$ of the composite film (°C.) |
|---|---|---|---|---|---|
| 7 | 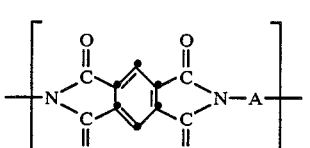 |  | $(C_4H_9)_4N^\oplus$ $BF_4^\ominus$ | $3 \times 10^{-1}$ | 280 |
| 8 | 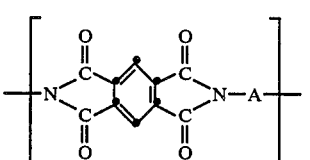 | 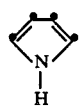 | $(C_4H_9)_4N^\oplus$ $CH_3-C_6H_4-SO^\ominus$ | $7 \times 10^{-4}$ | 280 |
| 9 | 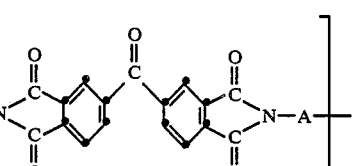 | 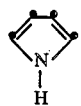 | $(C_4H_9)_4N^\oplus$ $BF_4^\ominus$ | $1 \times 10^{-1}$ | 300 |

TABLE IIb:

| Example | Electrode material | Current density (mA/cm²) | Thickness of the PI film (μm) | Duration of electrolysis (min) |
|---|---|---|---|---|
| 7 | Pt | 2.0–2.1 | 5 | 10 |
| 8 | Pt | 0.5–1.7 | 5 | 10 |
| 9 | Pt | 1.8–2.2 | 5 | 10 |

What is claimed is:

1. A composition which comprises
(a) a polypyrrole, and
(b) a polyimide which is soluble in organic solvents and which contains recurring units of formula I

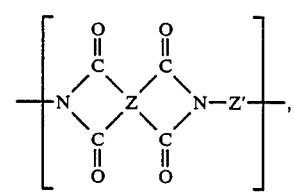

wherein the four carbonyl groups are attached direct to separate carbon atoms, which carbonyl groups are ortho or peri to one another so that 5- or 6-membered imide rings are formed, and Z is a tetravalent organic radical which contains at least one aromatic ring, and Z' is a divalent aliphatic, cycloaliphatic, aromatic, araliphatic or heterocyclic radical, or Z, Z' or both Z and Z' denote combinations of said radicals within the given definition.

2. A composition according to claim 1, wherein the polypyrrole is derived from pyrroles of formula X

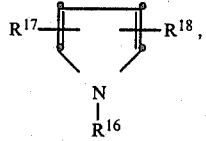 (X)

wherein $R^{16}$ is hydrogen, alkyl, cycloalkyl, aryl, aralkyl or alkaryl, which organic radicals may be substituted by —$COR^{20}$, —$COOR^{20}$, —$SO_2R^{20}$, —$SO_3R^{20}$, —$PO_3R^{20}R^{21}$, —$PO_2R^{20}$, —$NR^{20}R^{21}$, $OR^{20}$, —$SR^{20}$, —CN or —$SiR^{22}R^{23}R^{24}$, or wherein $R^{16}$ is also —CN, —$SO_2R^{20}$, —$SO_3R^{20}$, —$COR^{20}$, —$PO_2R^{20}$ or —$SiR_3^{22}$, each of $R^{20}$ and $R^{21}$ independently of the other is hydrogen, alkyl, aryl or aralkyl, each of $R^{22}$, $R^{23}$ and $R^{24}$ independently is alkyl or phenyl, each of $R^{17}$ and $R^{18}$ independently of the other is hydrogen, alkyl, cycloalkyl, aryl, aralkyl, alkaryl, —$COR^{19}$, —CN or halogen, and $R^{19}$ is hydrogen, alkyl or aryl.

3. A composition according to claim 2, wherein $R^{16}$, $R^{17}$ and $R^{18}$ are hydrogen.

4. A conductive composition according to claim 1, which contains polypyrrole in the oxidised form and, as counterion, an anion selected from the group consisting of $BF_4^-$, $PF_6^-$, $AsF_6^-$, $SbF_6^-$, $SbCl_6^-$, $ClO_4^-$, $IO_4^-$, $HSO_4^-$, $SO_4^{2-}$, $CF_3SO_3^-$, $CH_3C_6H_4SO_3^-$, $CF_3COO^-$, $HC_2O_4^-$ or $[Fe(CN)_6]^{3-}$, alkyl sulfate, alkyl sulfonate, alkyl phosphate or alkyl phosphonate, or a combination of such anions.

5. A composition according to claim 1, wherein the soluble polyimide is a compound containing the structural unit of formula I, wherein Z is a radical selected from

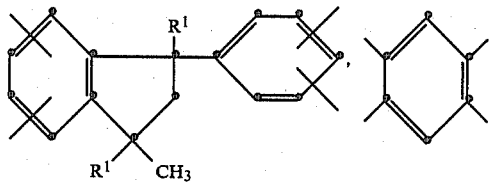

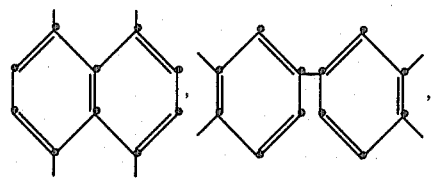

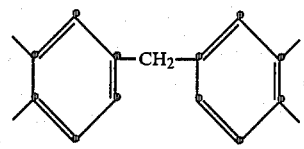

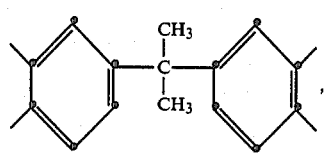

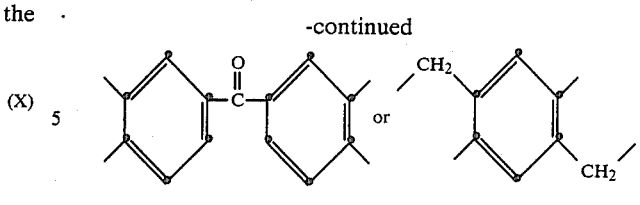

or a combination of such radicals, wherein $R^1$ is hydrogen or $C_1$–$C_5$alkyl, and Z' is a radial selected from

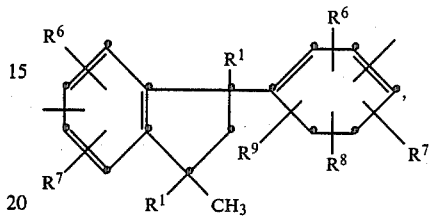

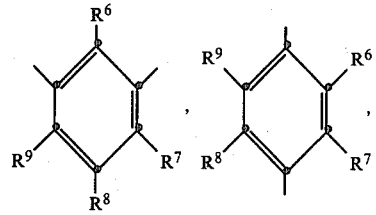

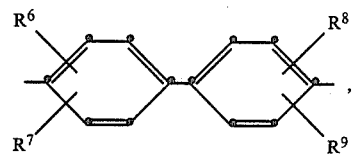

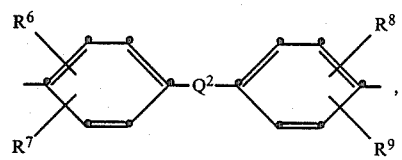

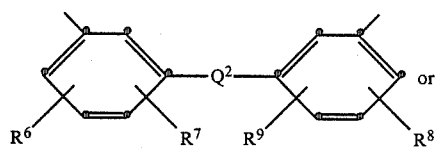

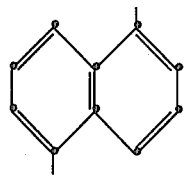

or a combination of such radicals, wherein $R^6$ to $R^9$ are each independently hydrogen, halogen or $C_1$–$C_5$alkyl, and $Q^2$ is —$CH_2$—, —CO—, —O—, —S—, —SO—, —$SO_2$— or —$C(CH_3)_2$—.

6. A composition according to claim 5, which contains a soluble polyimide of formula I, wherein
  (1) out of the total number of recurring polyimide units
    (A) 0 to 100% of such units have Z equal to a phenylindane radical of the structural formula

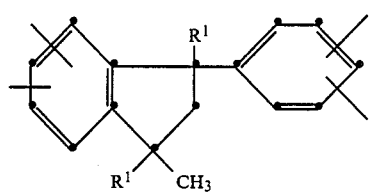

and (B) 0 to 100% of such units have Z' equal to a phenylindane radical of the structural formula

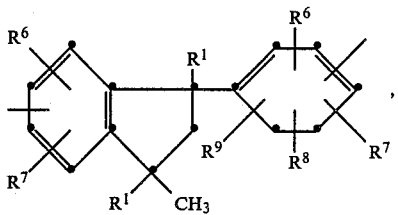
(IX)

wherein $R^1$ is hydrogen or $C_1$-$C_5$alkyl and $R^6$ and $R^9$ are each independently hydrogen, halogen or $C_1$-$C_5$alkyl, with the proviso that (2) out of the total number of radicals Z and Z', at least 10% are phenylindane radicals.

7. A composition according to claim 6, wherein Z is

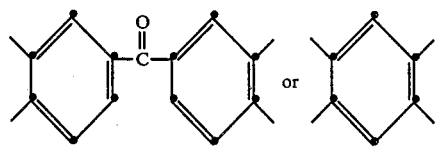

and Z' is

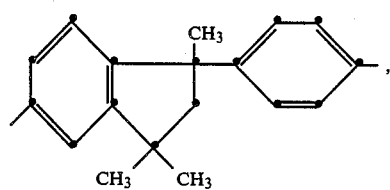

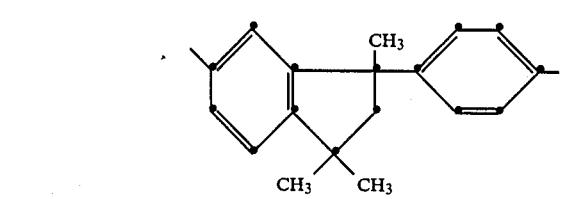

or mixture thereof.

8. A composition according to claim 5, wherein Z is a radical selected from

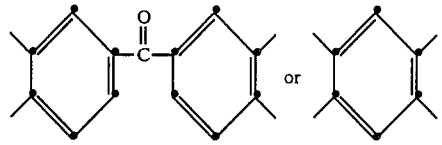

or is a combination of such radicals, and Z' is a radical selected from

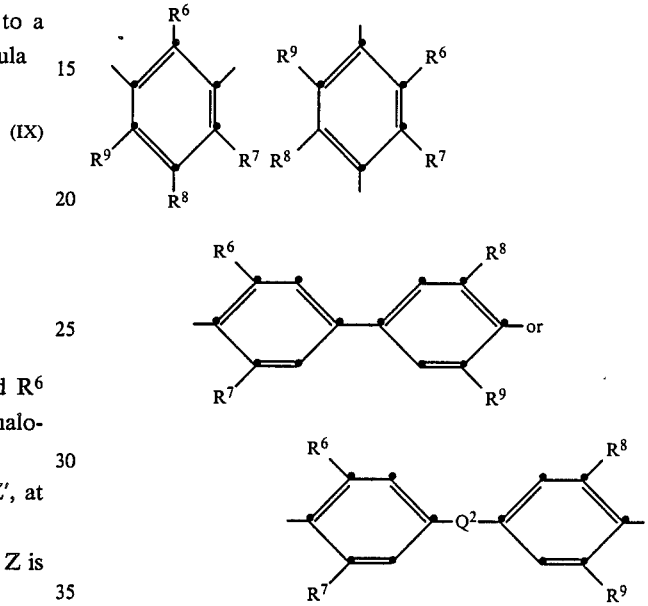

or, is a combination of such radicals, and wherein at least one of the radicals $R^6$ to $R^9$ is $C_1$-$C_5$alkyl.

9. A composition according to claim 1, which contains a polyimide of formula I, wherein Z is selected from and Z' is selected from

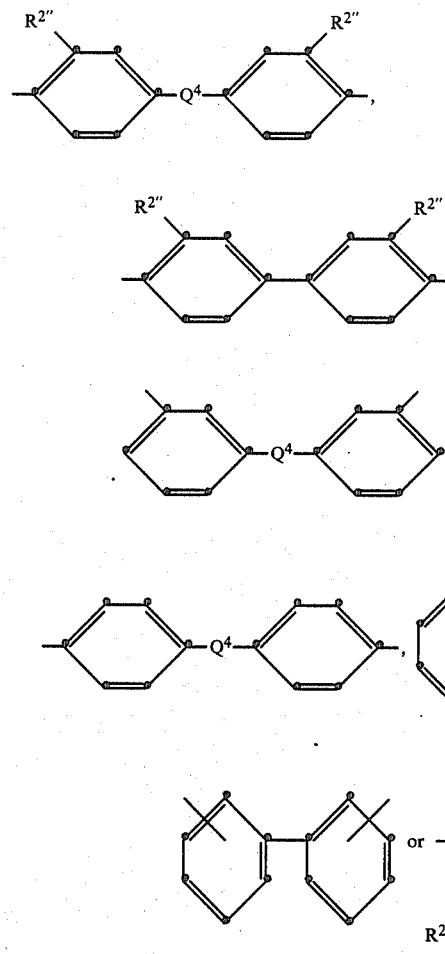

wherein $Q^4$ is —O—, —S—, —SO$_2$—, —CH$_2$—, —CO— or —C(CH$_3$)$_2$— and $R^{2''}$ is C$_1$-C$_5$alkoxy, halogen, —COOH, —OH or —SO$_3$H, and at least 30% of the groups Z are a radical of the formula

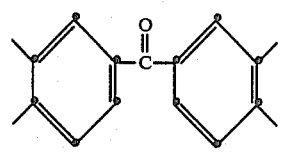

and at least 30% of the groups Z' are radicals of the formulae

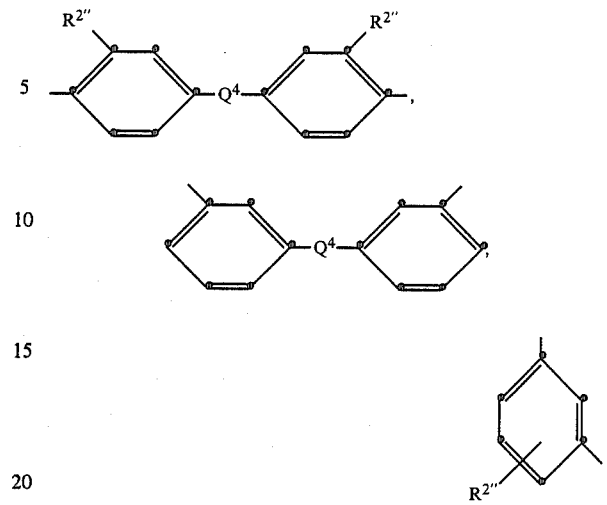

or the mixture thereof
said polyimides having a solubility in phenol of more than 10% by weight, and 0.5 g/100 ml of said polyimides having an inherent viscosity of more than 0.05 in m-cresol (at 30° C.).

10. A composition according to claim 1, which contains a polyimide of formula I, wherein Z is

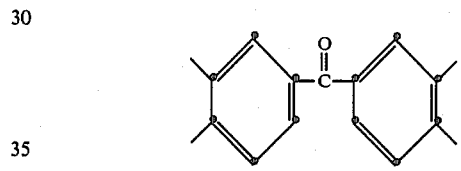

and 10 to 90% of the radicals Z' are 4,4'-diphenylmethane and the remainder are

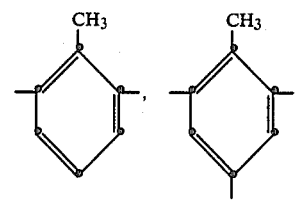

or mixture thereof.

11. A composition according to claim 1 wherein the polypyrrole is a homopolymer or copolymer of pyrrole, of a substituted pyrrole or of a mixture thereof; or is a copolymer of pyrrole, of a substituted pyrrole or of a mixture thereof with a 5- or 6-membered heteroaromatic compound.

* * * * *